United States Patent [19]
Stevens

[11] 3,862,539
[45] Jan. 28, 1975

[54] GROUND CLEARING ATTACHMENT FOR TRACTORS

[76] Inventor: J. L. Stevens, P.O. Box 374, Eureka, Mont. 59917

[22] Filed: July 27, 1973

[21] Appl. No.: 383,371

[52] U.S. Cl. ..................... 56/504, 56/13.3, 56/294
[51] Int. Cl. ............................................ A01d 49/00
[58] Field of Search ............ 56/504, 505, 294, 249, 56/295, 13.3, 13.4; 172/59

[56] References Cited
UNITED STATES PATENTS

| | | | |
|---|---|---|---|
| 1,041,980 | 10/1912 | Dremel | 172/59 |
| 1,156,234 | 10/1915 | Jones | 56/504 |
| 1,883,694 | 10/1932 | Goble | 56/504 |
| 2,888,795 | 6/1959 | Lundell | 56/505 X |
| 3,104,510 | 9/1963 | Voigt | 56/295 |
| 3,144,745 | 8/1964 | Sharps | 56/294 X |
| 3,369,797 | 2/1968 | Cobey | 56/504 X |

*Primary Examiner*—Louis G. Mancene
*Assistant Examiner*—J. N. Eskovitz
*Attorney, Agent, or Firm*—Wells, St. John & Roberts

[57] ABSTRACT

A ground clearing attachment for tractors comprises a supporting framework removably mountable to blade support arms of a conventional tractor. A forwardly open housing is mounted to the framework and includes a pair of rotatable helical blades. The blades are powered by an engine mounted to the framework to rotate about substantially horizontal axes that converge at the longitudinal center of the tractor. A plurality of cutting elements are mounted to the blades for rotation therewith. A number of cutting elements are mounted to the framework adjacent the blades and are axially interspersed between the cutting elements on the blades. As the blades rotate, the cutting elements mounted thereto, move between the cutting elements supported on the framework. The blades are rotated at sufficient velocity to produce an air current within the housing which is utilized to carry debris pulverized by the cutting elements inwardly along the housing to an exhaust duct. The exhaust duct receives and directs the debris to one side of the tractor as it moves along.

6 Claims, 8 Drawing Figures

3,862,539

GROUND CLEARING ATTACHMENT FOR TRACTORS

BACKGROUND OF THE INVENTION

The present invention relates generally to ground clearing apparatus and more particularly to such apparatus that may be attached to conventional tractors.

The present procedure for clearing ground for agricultural and roadway building purposes is to first dislodge the existing debris from the ground and then collect it, either to be removed to a different location or to be burned. The final step is to smooth and level the ground to a desired condition. Obviously it would be desirable to utilize a single machine designed to accomplish all of the above steps in a single operation.

The above problem is realized to a limited degree by a tractormounted vegetation disintegrator disclosed in the Gebhardt Pat. No. 2,974,472. Gebhardt utilizes a drum and a number of chopping teeth arranged about the drum in a helical pattern. The teeth and a plurality of comb members are utilized to disintegrate debris in the path of the apparatus. The Gebhardt apparatus is intended for use on rather fine debris such as brush and does not include means for removing and depositing the pulverized debris away from the path of the apparatus.

The Bauer et al U.S. Pat. No. 3,338,037 discloses a portable grinder and harvester which also includes meshing teeth and comblike projections. The teeth and projections are rotated about separate axes to pulverize material engaged therebetween. This device is rather complicated in nature and is intended for use only on vegetation that is somewhat easily disintegrated such as corn stalks.

The Skromme U.S. Pat. No. 2,725,704 describes a forage harvester with stalk directing means which is intended for use in harvesting corn or other stalk crops. The material is engaged and chopped by rotating knives and subsequently moved to an auger which is operated to move the chopped particles transversely away from the path of the harvester.

The apparatus of the present invention comprises an attachment for conventional tractors that includes elongated helical blades rotatably held within a forwardly open housing. The blades include cutting elements mounted thereon that are axially spaced along the axes of the blades. Cutting elements are also mounted to a supporting framework adjacent to the blades and are axially interspersed between the cutting elements on the blades so that as the blades are rotated, the cutting elements mounted thereto move in rotational paths between the stationary cutting elements. The helical blades are powered to rotate at sufficient velocity to produce a directional air current within the housing to carry debris pulverized by the cutting elements inwardly to an exhaust outlet. The debris is directed from the outlet to one side of the path of the apparatus. The blades and cutting elements are designed so the attachment may be utilized to clear heavy debris such as stumps and small trees from its path and yet leave a relatively smooth, level grade behind.

SUMMARY OF THE INVENTION

A ground clearing attachment for a tractor is described comprising a supporting framework having a forwardly elongated housing mounted thereto extending transversely across the width of the tractor. The attachment includes elongated helical blade means rotatably mounted within the housing and extending therein transversely across the width of the tractor. Drive means is included on the framework to rotate the helical blade means at sufficient velocity to produce an air current across the housing. A plurality of cutting elements are provided, one set being mounted to the helical blade means and axially spaced thereon for movement along rotational paths. A second set of cutting elements is mounted to the framework adjacent the helical blade means, said elements being spaced apart so that they are axially interspersed between the rotational paths of the first set of cutting elements.

It is a first object of my invention to provide a ground clearing attachment for tractors that will substantially reduce the cost and time involved in ground clearing operations.

It is a further object of my invention to provide such an attachment that includes self-contained power means and is adapted to be mounted to conventional tractors with relative ease.

Another object of my invention is to provide such an attachment that includes cutting elements that are easily replaceable. The preferred elements present several alternate cutting edges that may be selectively utilized for cutting purposes, thereby increasing the useful life of the elements.

These and other objects and advantages will become evident upon reading the following description, which, taken with the accompanying drawings, discloses a preferred form of my invention.

A BRIEF DESCRIPTION OF THE DRAWINGS

A preferred form of my invention is illustrated in the attached drawings wherein.

DETAILED DESCRIPTION OF A PREFERRED EMBODIMENT

Figure 1:
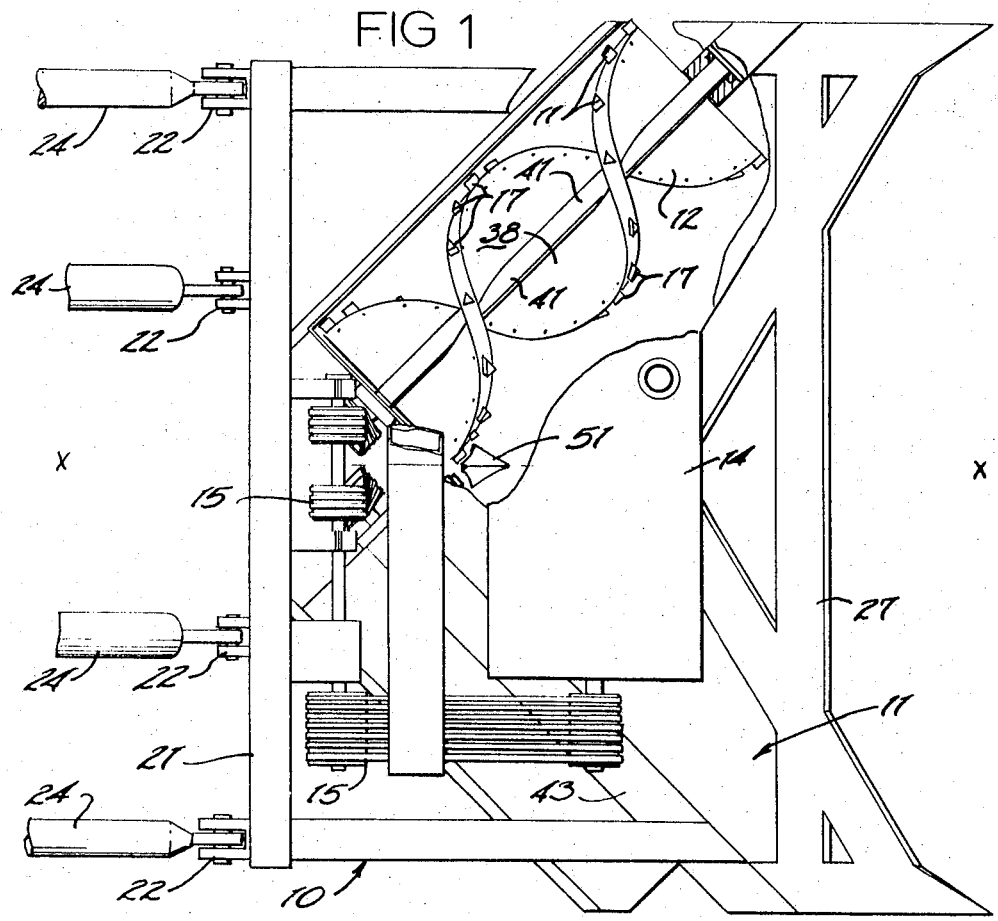
FIG. 1 is a plan view of the apparatus with portions thereof broken away.

A preferred form of the present invention is illustrated in the accompanying drawings, basically comprising a supporting framework 10 mounting a forwardly open elongated housing 11. The housing 11 partially encloses two helical blades 12 and 13 which are rotatably mounted to the framework 10 and are powered to rotate about converging horizontal axes by a drive means comprising an engine 14 mounted to the framework 10.

Power is transferred from the engine 14 to the blades 12 and 13 by means of a belt and pulley arrangement generally indicated in the drawings by the reference numeral 15. The drive linkage will not be discussed in great detail since it is fairly obvious that many different conventional means may be operatively connected between the engine 14 and blades 12 and 13 to transfer torque from the engine to the blades.

A plurality of cutting elements 17 are mounted to the blades 12 and 13, and to the supporting framework 10 adjacent the blades. The elements 17 that are mounted to the blades 12 and 13 are arranged axially along the blades so they will move in circular paths between the cutting elements 17 fixed to the framework 10 (FIG. 4) as the blades rotate.

Figure 2:
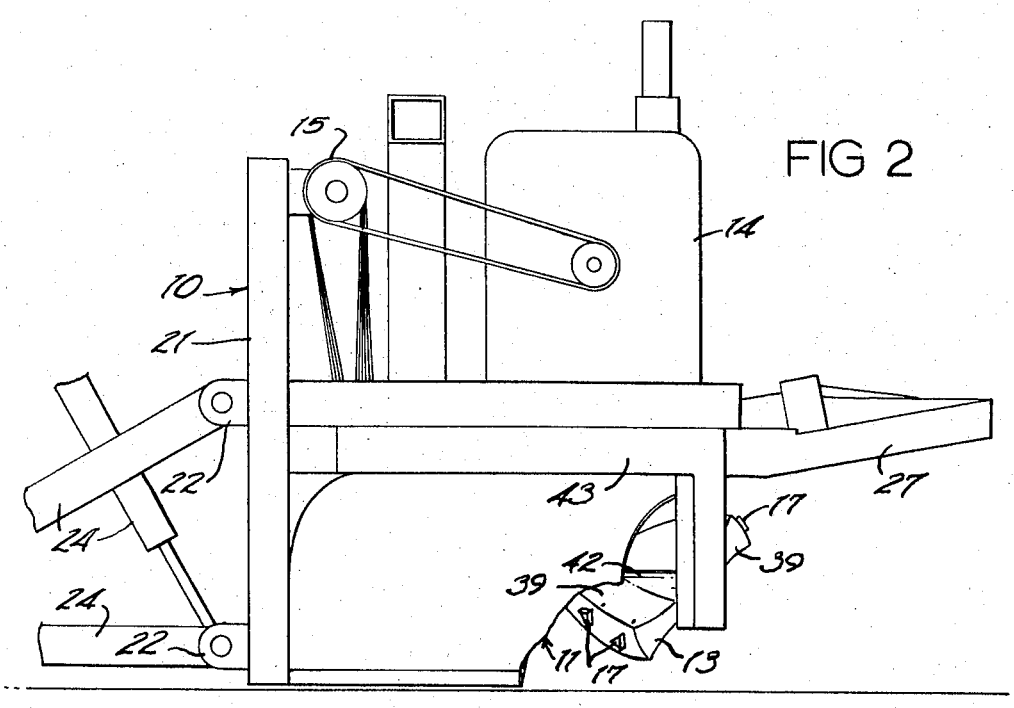
FIG. 2 is a side elevational view of the attachment.
Figure 3:
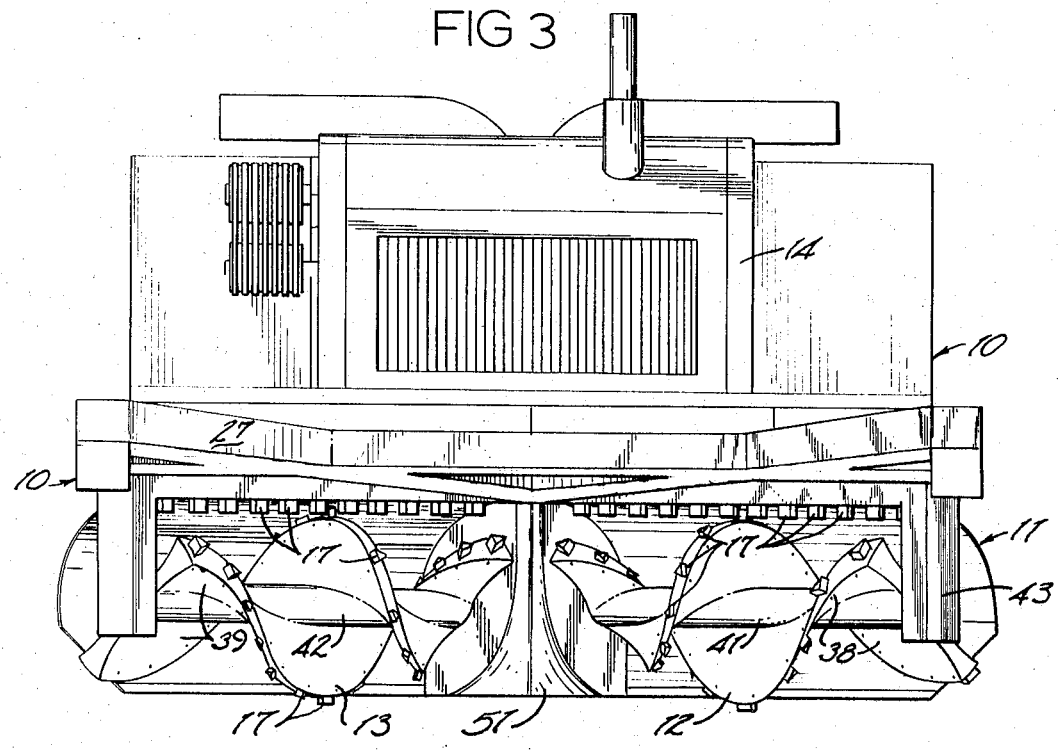
FIG. 3 is a front elevational view of the attachment.

The framework 10 is shown in FIGS. 1 and 2 as comprising an upright central support frame member 21. Frame member 21 includes brackets 22 that facilitate mounting of the attachment to blade support arms 24 of a tractor (not shown). By mounting the attachment to the blade support arms 24, I am able to utilize the existing controls of the tractor to adjust the elevational and angular orientation of the attachment. The operator may thus select the elevation or angular orientation of the attachment while it is in operation. It is also intended that the attachment be manufactured with brackets 22 of different configuration to enable mounting of the attachment to different tractor models and brands.

The forwardly open housing 11 carried by the supporting framework 10 basically comprises two sections, each extending angularly outward and forward of the tractor from a longitudinal centerline x—x(FIG. 1). Center-line x—x defines the longitudinal center of the attachment and of a forward path of travel of the tractor. The housing includes a forwardly protruding lip 27 located elevationally above the blades 12 and 13 as shown in FIG. 2. The lip 27 allows the attachment to engage and push debris such as small trees downwardly into the path of the rotating blades 12, 13. The rearward portion of the housing is curved downwardly to partially enclose the blades 12, 13.

The blades 12, 13 include diametrically opposed vanes 38, 39 respectively, that wind in a helical path about central shafts 41, 42. The vanes 38, 39 are wound about the shafts 41, 42 in opposite directions so they will engage and direct material inwardly toward the longitudinal center x—x of the attachment as the blades are rotated in the direction indicated by the arrow in FIG. 5.

Figure 5:
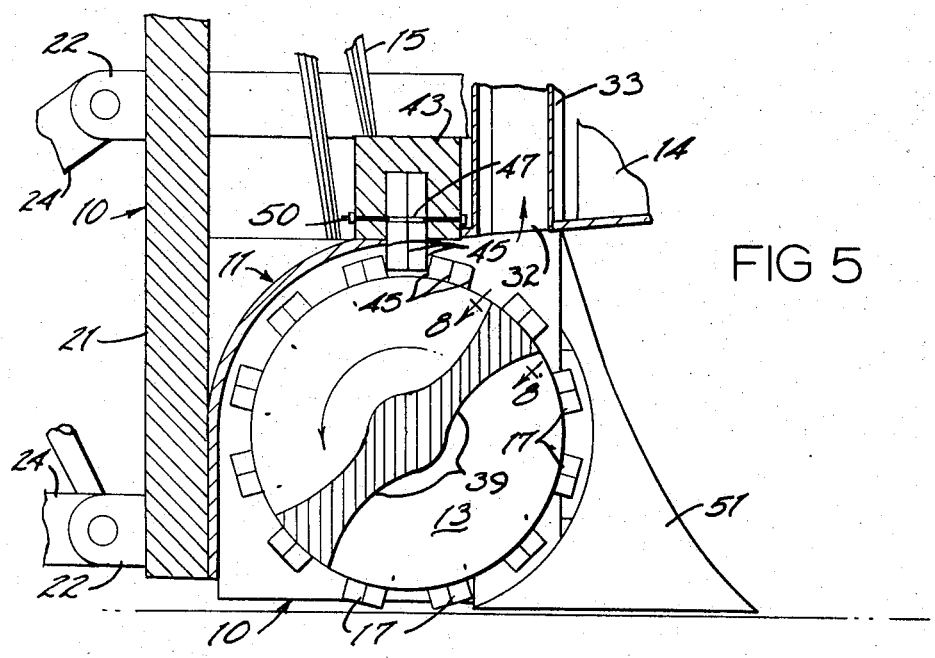
FIG. 5 is an enlarged fragmentary cross-sectioned side elevational view of one side of the attachment adjacent the center thereof.

The vanes 38, 39 are concave in cross section as may be noted in FIG. 5 to assist in forming a directional air current within the housing 11 as the blades are rotated. It is intended that the blades be rotated at sufficient velocity to create an air current of sufficient force to carry debris pulverized by the cutting elements 17 across the housing and outward through the exhaust duct 16. The estimated velocity of the blades 12 and 13 necessary to produce such an air current is approximately 1,000 rpm.

Figure 6:
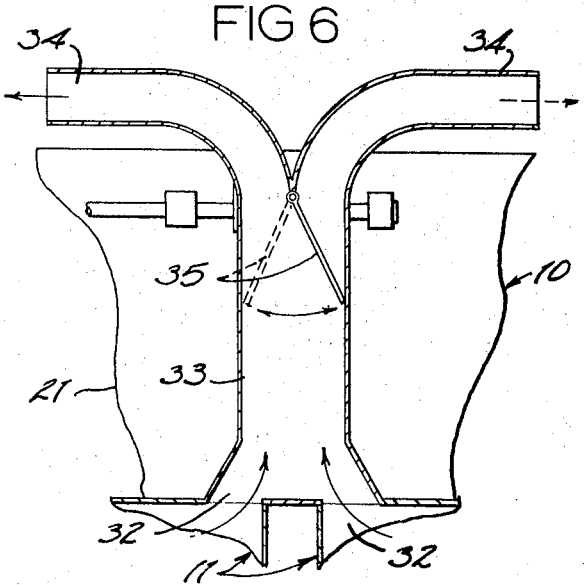
FIG. 6 is a fragmentary frontal cross section of the exhaust means.

The air current produced by blades 12, 13 moves inwardly from open ends 28 of the housing toward exhaust openings 32 (FIGS. 5 and 6) of the exhaust duct 16. The openings 32 lead to an upright chute 33 which is divided into transversely extending outlets 34. The air current and debris carried thereby may be selectively directed through either of the outlets 34 by operation of a directional deflector 35 positioned within the chute 33 at the juncture of the outlets 34.

Figure 4:
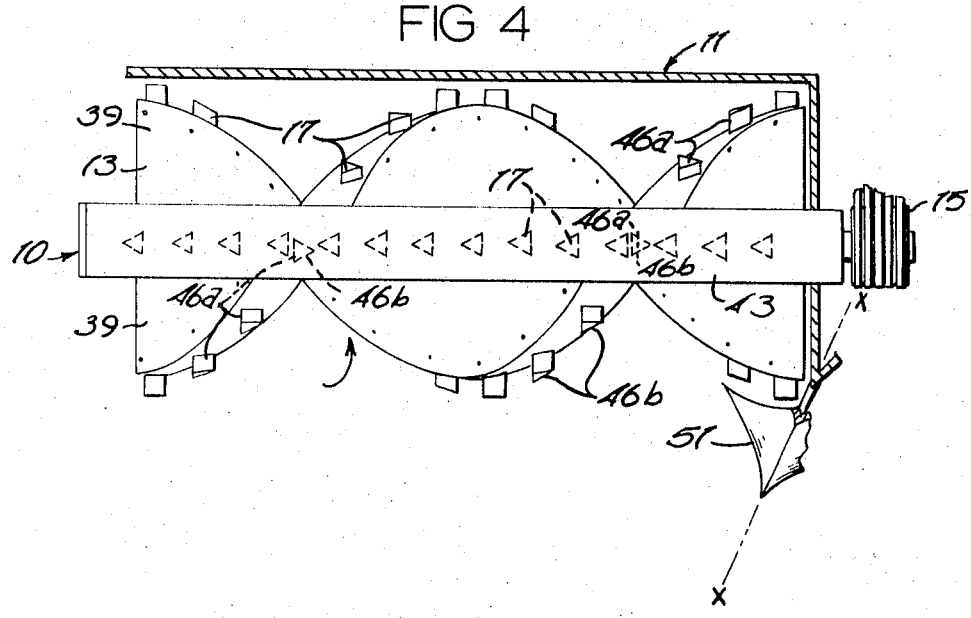
FIG. 4 is a fragmentary plan sectional view of one side of the helical blade means.
Figure 8:
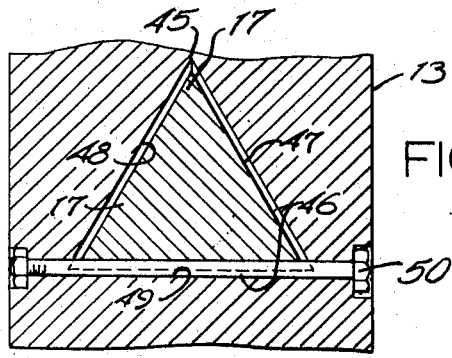
FIG. 8 is a fragmentary cross sectional view of a cutting element taken substantially along line 8—8 in FIG. 5.

The helical blades 12 and 13 carry a first set of cutting elements 17 as shown in FIGS. 4, 5 and 8. The cutting elements of the first set are mounted to the blades 12 and 13 to extend substantially radially outward therefrom. The elements are spaced axially along the blades at equal prescribed spaces for movement in predetermined rotational paths about the rotational axes of the blades.

A second set of cutting elements 17 is mounted to horizontal bar supports 43 of the framework 10. The elements 17 of the second set are spaced along the supports 43 so that they are axially interspersed between the rotational paths of the cutting elements 17 of the first set mounted to the blades 12 and 13. This arrangement may best be seen in FIG. 4 wherein the cutting elements 17 of the second set are shown in dotted lines on the underside of a support 43 of one side of the attachment.

The horizontal bar supports 43 are utilized both to mount the second set of cutting teeth 17 and to rotatably carry the blades 12 and 13. The bars 43 extend angularly outward along framework 10 so that the outer ends of the blades 12, 13 extend transversely past the sides of the tractor.

Figure 7:
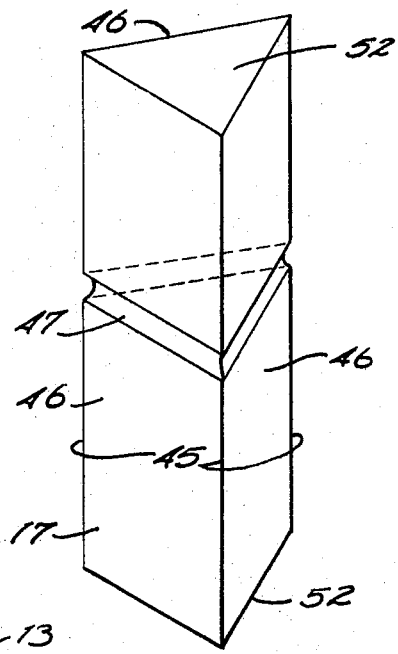
FIG. 7 is a pictorial detail view of a single cutting element.

A single cutting element 17 is illustrated in FIG. 7 comprising three longitudinal edges 45 defined by three joined sides 46. A peripheral groove 47 is provided between the ends of each element 17. The elements 17 are received within complementary recesses 48 formed in the supports 43 and blades 12, 13 (FIGS. 5 and 8). Recesses 48 include peripheral grooves 49 complementary to the grooves 47 formed in the cutting elements. The cutting elements 17 may be mounted within the recesses 48 with the peripheral grooves 47 aligned with the complementary grooves 49 to form passageways for locking bolts 50.

Each cutting element is triangular in cross section with all sides 46 being equal in length between edges 45 so they form an equilateral triangle in cross section. This cross sectional shape is utilized to allow the cutting elements to be selectively positioned in the recesses 48 with any one of the edges 45 in an operative cutting position. The peripheral grooves 47 are located midway between ends 52 of each element 17 so the edges 45 adjacent either end 52 may be selectively exposed as cutting surfaces. The number of available cutting surfaces presented by the cutting elements 17 is an extremely important feature of my invention since each cutting element 17 includes six cutting edges that may be exposed before resharpening or replacement becomes necessary.

The cutting elements 17 of the first set are mounted to the blades 12 and 13 each with one side 46a aligned substantially perpendicular to the rotational axis of the supporting blade. The adjacent forward side 46b then extends angularly rearward and inwardly toward the center line X—X of the attachment (FIG. 4). The adjacent forward sides 46b serve to act as a deflecting surfaces to further assist in guiding the pulverized debris and material engaged by the cutting elements 17 inwardly toward the exhaust duct 16.

It is intended that operation of the attachment be controlled by the tractor operator through conventional control mechanisms such as throttle and clutch controls. In operation then, the attachment is moved forwardly by the tractor as the helical blades 12 and 13 are rotated independently by the engine 14. As the tractor progresses forwardly along an intended path of travel, debris in the path of the rotating blades is engaged and carried by the moving cutting elements 17 to the axially interspersed stationary cutting elements 17 of the second set. As the cutting elements of the first set move between the cutting elements of the second set, debris carried by the elements of the first set is wedged between the stationary and moving elements and thereby pulverized.

The velocity of rotation of the blades 12, 13 produces a constant inward air current of sufficient force to carry the pulverized debris inwardly to the exhaust duct 16 where it is exhausted through a selected outlet 34. Debris located near the longitudinal center X—X of the forward path of travel of the tractor is directed to either transverse side of the center by means of a "frog" or "share" 51 carried by the frame 10. The frog projects forwardly of the rotational paths of the cutting element 17 and is mounted to the framework 10 at the inward ends of the blades 12 and 13. The frog serves to engage and deflect debris laterally outward into the paths of the rotating blades.

The tractor controls may be utilized to set the elevation of the attachment to determine the depth of cut of the moving cutting elements 17. The elevational adjustments may also be utilized when large objects such as stumps are encountered. When this occurs, the operator may set the elevation of the attachment so the teeth 17 will cut at a grade higher than required, then make several passes over the area, lowering the attachment after each pass until the selected grade is reached.

It may become obvious from the above description and the attached drawings that various changes and modifications may be made therein without departing from the intended scope of this invention. Therefore, only the following claims are intended to be taken as definitions of the present invention.

What I claim is:

1. A tractor secured ground clearing attachment comprising:
   a supporting framework carried at a forward end of the tractor;
   a forwardly open elongated housing mounted to the front of said framework and extending transversely across the width of the tractor with respect to a forward path of travel of the tractor;
   elongated helical blade means rotatably mounted within the housing and extending transversely across the width of the tractor;
   drive means on said framework operatively connected to the helical blade means for rotating the helical blade means at sufficient velocity to produce a transverse air current across the housing along the helical blade means;
   a plurality of cutting elements including a first and second set thereof, said first set of cutting elements being mounted to the helical blade means and axially spaced thereon for movement therewith along rotational paths;
   said second set of cutting elements being mounted to the frame adjacent the helical blade means and axially interspersed between the rotational paths of said first set of cutting elements, whereby debris engaged therewith is pulverized between the meshing teeth of the first and second sets;
   said helical blade means being comprised of vanes extending radially outwardly from a central shaft, said vanes winding inwardly from the outer ends of the housing to direct the air current and debris inwardly from the outer ends; and
   exhaust means located between the ends of the housing for receiving the air current and debris and directing it to one side of the path of travel clear of the tractor.

2. The ground clearing attachment set out in claim 1 wherein the radial vanes are concave in cross section.

3. The ground clearing attachment set out in claim 1 wherein the elongated housing is comprised of two sections extending angularly outward and forward from the longitudinal centerline of the tractor and wherein the helical blade means is comprised of two separate blade sections rotatably mounted to the two housing sections and extending along with the housing sections angularly outward and forward from the longitudinal centerline of the tractor along horizontal rotational axes.

4. The ground clearing attachment set out in claim 3 wherein cutting elements are mounted within recesses formed within the helical blade means and supporting framework and are each identical in configuration, each being in the form of an elongated polyhedron of equilateral triangular cross section.

5. The ground clearing attachment set out in claim 4 wherein the recesses formed in the helical blade means are positioned on the helical blade means to align each cutting element with one side substantially perpendicular to the rotational axis of its supporting blade section, and with the corner opposite the one side pointing in the direction of movement of the air current, and wherein the cutting elements of the second set are mounted to support bars on the frame aligned with the helical blade means so that cutting elements of the first set move between the stationary cutting elements of the second set as the helical blade sections are rotated.

6. The ground clearing attachment set out in claim 5 further comprising mounting means for releasably securing the stationary and cutting elements to the support bar and helical blade means respectively, to enable the cutting elements to be selectively mounted with any one of the three extending corners in an operative work engaging position.

* * * * *